April 18, 1961 W. L. CALDER, JR 2,979,989
ADJUSTABLE PANORAMIC AUTO REAR VIEW MIRROR
Filed Jan. 29, 1960 2 Sheets-Sheet 1
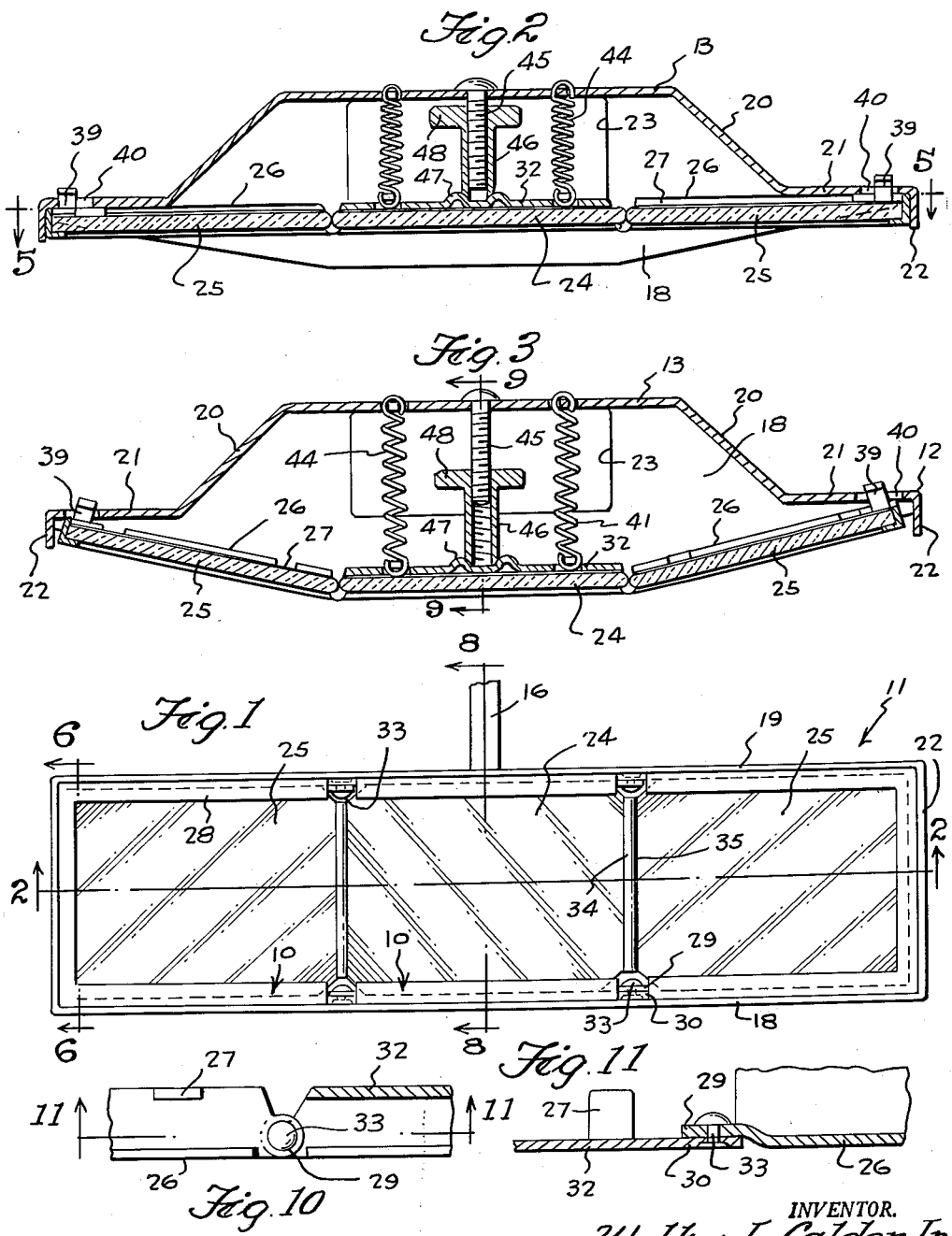
INVENTOR.
Walter L. Calder, Jr.
BY
McMorrow, Berman + Davidson
ATTORNEYS April 18, 1961 W. L. CALDER, JR 2,979,989
ADJUSTABLE PANORAMIC AUTO REAR VIEW MIRROR
Filed Jan. 29, 1960 2 Sheets-Sheet 2
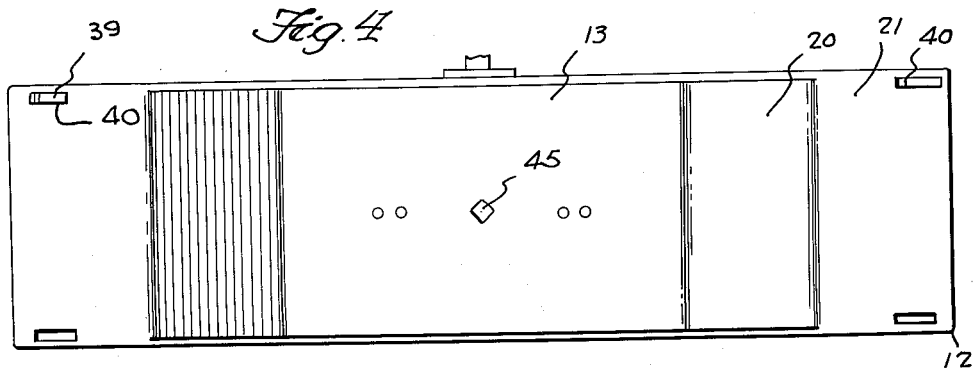
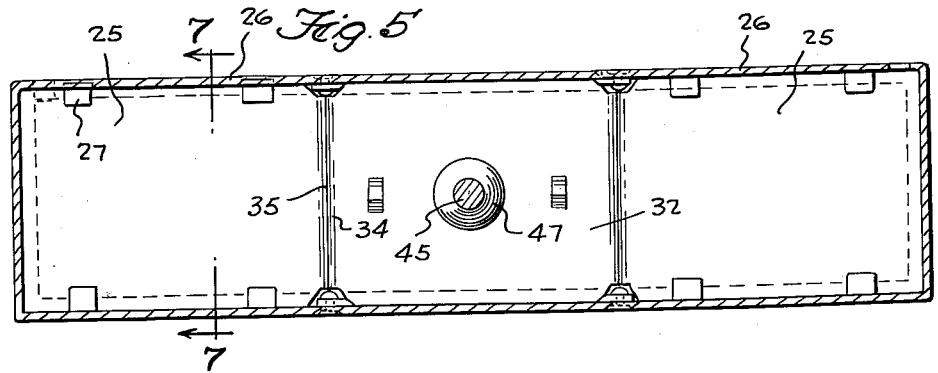
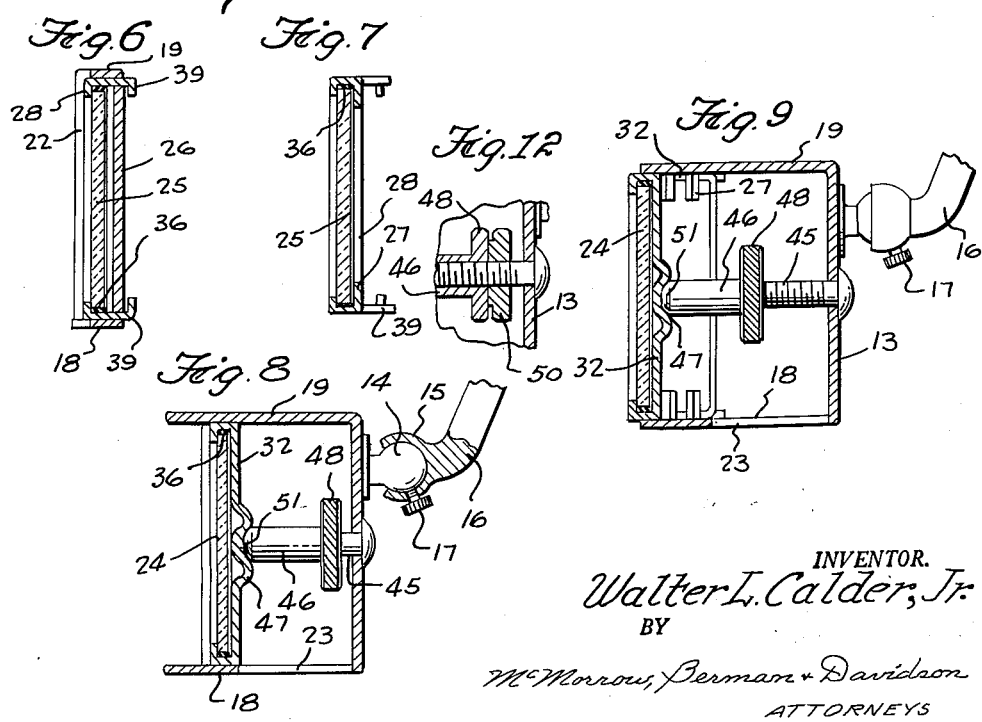
INVENTOR.
Walter L. Calder, Jr.
BY
McMorrow, Berman + Davidson
ATTORNEYS

United States Patent Office 2,979,989
Patented Apr. 18, 1961

2,979,989
ADJUSTABLE PANORAMIC AUTO REAR VIEW MIRROR

Walter L. Calder, Jr., 99 Maple St., Milton 87, Mass.

Filed Jan. 29, 1960, Ser. No. 5,523

1 Claim. (Cl. 88—87)

This invention relates to rear view mirrors for vehicles, and more particularly to a multiple-element rear view mirror which is adjustable to permit the driver of a vehicle to view a relatively wide area directly behind and laterally of his vehicle.

A main object of the invention is to provide a novel and improved adjustable, wide-angle rear view mirror which is simple in construction, which is easy to install, and which is easily adjustable in accordance with the specific requirements of the operator of the vehicle on which it is mounted to allow the operator to obtain a sweeping view of a wide angle behind and laterally of the vehicle.

A further object of the invention is to provide an improved multiple-face rear view mirror of the adjustable type, said mirror being relatively inexpensive to fabricate, being durable in construction, being relatively compact in size, and being easy to adjust.

Further objects and advantages of the invention will become apparent from the following description and claim, and from the accompanying drawings, wherein:

Figure 1 is a front elevational view of an improved multiple-face rear view mirror constructed in accordance with the present invention.

Figure 2 is a horizontal cross sectional view taken substantially on the line 2—2 of Figure 1.

Figure 3 is a horizontal cross sectional view, similar to Figure 2, but showing the center element of the mirror assembly adjusted forwardly from the position shown in Figure 2.

Figure 4 is a rear elevational view of the mirror assembly shown in Figures 1 to 3.

Figure 5 is a vertical cross sectional view taken substantially on the line 5—5 of Figure 2.

Figure 6 is a vertical cross sectional view taken on the line 6—6 of Figure 1.

Figure 7 is a vertical cross sectional view taken on the line 7—7 of Figure 5.

Figure 8 is a vertical cross sectional view taken on the line 8—8 of Figure 1.

Figure 9 is a vertical cross sectional view taken on the line 9—9 of Figure 3.

Figure 10 is an enlarged horizontal cross sectional view taken substantially on the line 10—10 of Figure 1.

Figure 11 is a cross sectional view taken on the line 11—11 of Figure 10.

Figure 12 is an enlarged cross sectional detail view taken through the threaded adjusting means for the movable intermediate mirror element of the rear view mirror assembly and showing the use of a lock nut on the threaded supporting shaft to secure the abutment nut in a fixed position.

Referring to the drawings, 11 generally designates an improved rear view mirror assembly constructed in accordance with the present invention. The rear view mirror assembly comprises a horizontally elongated housing 12 adapted to be mounted on a motor vehicle in a position whereby it may be easily viewed by the operator of the vehicle for obtaining a view rearwardly and laterally with respect to the vehicle. Thus, the housing 12 is adapted to be mounted vertically and is provided at the upper intermediate portion of its rear wall 13 with a rearwardly projecting ball element 14 which is adjustably received in the socket element 15 of a supporting bracket 16 adapted to be secured at the desired location on the motor vehicle. The socket 15 is provided with a set screw 17 to lock the ball 14 when the housing 13 has been adjusted to a desired orientation with respect to the driver of the vehicle, which will be such that the housing 12 is supported in a vertical position with its longitudinal axis extending substantially horizontally.

The housing 12 is provided with a bottom wall 18 and a top wall 19 which merge with respective lower and upper marginal portions of the rear wall 13. Said rear wall is generally of rearwardly convex shape, as is clearly shown in Figures 2 and 3, and includes the respective inclined vertical side portions 20, 20 which connect the rearmost portion of the rear wall 13 to respective forwardly offset vertical wall portions 21, 21. Housing 12 is provided with the respective opposite vertical end flanges 22, 22 and with a relatively large rectangular aperture 23 in the rear portion of the bottom wall 18.

Designated at 24 is an intermediate vertical mirror segment which is arranged movably between the top and bottom walls 19 and 18, the intermediate mirror segment 24 being hinged at its opposite side edges to respective additional vertical mirror segments 25, 25 which are in turn pivotally and slidably connected at their outer vertical edge portions to the opposite end portions of the rear wall segments 21, 21. Thus, the side mirror segments 25, 25 are mounted in respective rectangular frames 26, 26 which are flanged to receive the mirror segments and which are formed with rear retaining tabs 27 to hold the mirror segments against the front flanges 28 of the frames. The inner ends of the frames are formed with pivot lugs 29 which are pivotally connected to cooperating pivot lugs 30 projecting horizontally from the respective corners of a channeled supporting housing 32 in which the intermediate mirror segment 24 is mounted. The lugs 29 and 30 are pivotally connected by rivets 33, as is clearly shown in Figures 10 and 11. The adjacent vertical edge portions of the intermediate mirror segment 24 and the side mirror segments 25, 25 are rounded, as shown at 34 and 35 to facilitate rotation of the side mirror segments 25, 25 with respect to the opposite vertical edges of the intermediate mirror segment 24.

Suitable sealing gaskets 36 of rubber or other suitable resilient deformable material are provided between the edges of the mirror segments and the adjacent surfaces of the supporting members 26 and 32.

The frames 26, 26 are provided at their rear corner portions with rearwardly projecting hooked lugs 39 which extend slidably and rotatably through horizontal slots 40 formed in the outer end portions of the rear wall segments 21, 21, whereby the side mirror segments 25, 25 are slidably and pivotally connected to the opposite rear wall segments 21, 21, as above stated.

Respective coiled springs 41, 41 are connected between the side portions of the intermediate mirror segment housing 32 and the rearmost portion of rear wall 13, as shown in Figures 2 and 3, the coiled springs 41 acting to bias the intermediate mirror element 24 rearwardly in the housing 12. Rigidly secured to the intermediate portion of the rearmost section of rear wall 13 is forwardly projecting threaded member 45 on which is threadedly engaged an abutment nut 46 which rotatably engages in an annular seat or socket 47 formed in the intermediate mirror housing member 32. The abutment nut 46 is formed with the enlarged knurled finger-engaging knob element 48 which is located immediately above the rectangular aperture 23 provided in the bottom wall 18 of housing 12, so that access is provided for manually rotating the nut 46.

By rotating the nut member 46, the intermediate mirror segment 24 may be adjusted forwardly to a desired position, for example, from the position illustrated in Figure 2 to the position illustrated in Figure 3, whereby the side mirror segments 25, 25 are angled with respect to the intermediate mirror segment 24, providing a widened view rearwardly and laterally of the vehicle on which the device is mounted, in accordance with the particular requirements of the operator of the vehicle. In order to adjust the position of the intermediate mirror segment 24 it is merely necessary for the operator to insert a finger through the opening 23 and rotate the knurled flange 48 of the nut member 46 until the intermediate mirror segment 24 has been adjusted to provide the desired angular arrangement of the side mirror segments 25, 25.

If so desired, a lock nut 50 may be provided on the threaded supporting stud 45 which may be tightened against the flange 48 to lock the nut 46 in its desired position. Figure 12 illustrates this arrangement, and shows the lock nut 50 disposed in locking engagement with said flange 48.

As shown in Figure 9, the forward end of the abutment nut 46 is preferably rounded, as shown at 51, to facilitate its rotation in the rounded socket 47 provided therefor in the intermediate mirror housing member 32.

While a specific embodiment of an improved motor vehicle rear view mirror assembly has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A motor vehicle rear view mirror assembly comprising a horizontally elongated vertical housing adapted to be mounted on a motor vehicle, said housing having a rear wall, an intermediate vertical mirror element movably mounted in said housing and exposed at the front of the housing, respective additional vertical mirror elements hinged at their inner vertical edges to the side edges of said intermediate mirror element and also exposed at the front of the housing, means pivotally and slidably connecting the outer vertical edge portions of said additional mirror elements to the respective opposite side portions of the housing, respective coiled springs connecting the side portions of said intermediate vertical mirror element to said rear wall and biasing the intermediate mirror element rearwardly in the housing, a transversely extending threaded member secured to the rear wall of the housing and projecting toward the intermediate mirror element between said coiled springs, an annular seat in the intermediate mirror element between said coiled springs, an abutment nut member engaged on said threaded member and engaging in said annular seat to at times hold said intermediate mirror element in a transversely adjusted position in the housing against the force of said coiled springs, and a flange on said nut member for manually adjusting the nut member on said threaded member.

References Cited in the file of this patent

UNITED STATES PATENTS

| | | |
|---|---|---|
| 2,534,495 | Younghusband | Dec. 19, 1950 |
| 2,869,425 | Kershaw | Jan. 20, 1959 |